Nov. 7, 1961  H. HARRIS, JR., ET AL  3,008,073
CONSTANT TORQUE SERVO SYSTEM
Filed Aug. 30, 1943  2 Sheets-Sheet 1
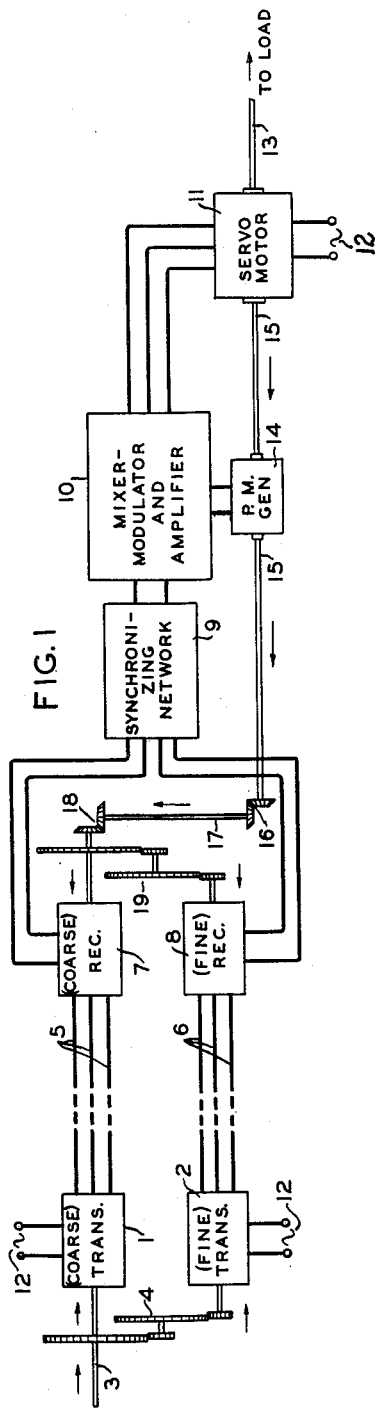
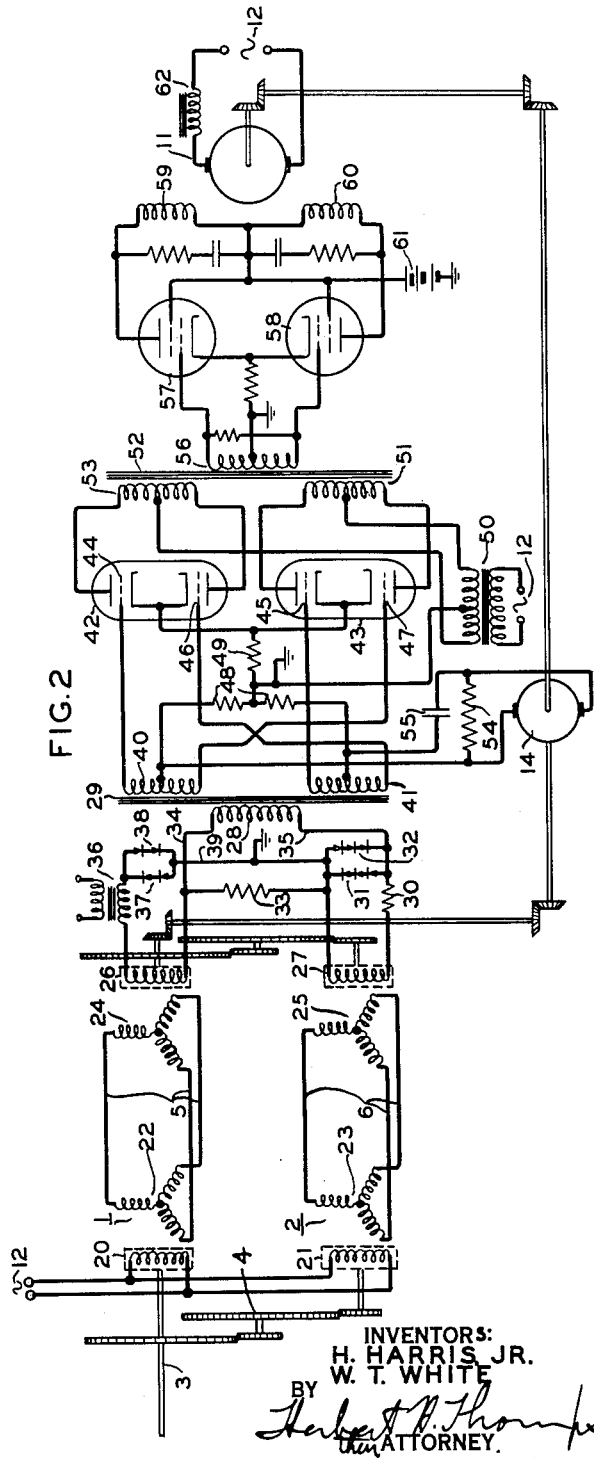
INVENTORS:
H. HARRIS, JR.
W. T. WHITE
BY
ATTORNEY.

Nov. 7, 1961  H. HARRIS, JR., ET AL  3,008,073
CONSTANT TORQUE SERVO SYSTEM
Filed Aug. 30, 1943  2 Sheets-Sheet 2

INVENTORS:
H. HARRIS, JR.
W. T. WHITE
BY Herbert H. Thompson
their ATTORNEY

United States Patent Office 3,008,073
Patented Nov. 7, 1961

3,008,073
CONSTANT TORQUE SERVO SYSTEM
Herbert Harris, Jr., Cedarhurst, and Walter T. White, Hempstead, N.Y., assignors to Sperry Rand Corporation, a corporation of Delaware
Filed Aug. 30, 1943, Ser. No. 500,478
16 Claims. (Cl. 318—30)

Our invention relates to a servo system which is characterized by the fact that the output torque of the servo motor embodied therein can be controlled by the field current supplied thereto and the torque is substantially independent of the operating speed of the servo, or, has a minimum variation in torque output with changes in rate of operation thereof.

The servo system of the present invention is particularly adapted for use in driving the azimuth, elevation and slant range input shafts of the computer of a director, wherein these data shafts are connected with loads of a dry friction character, or loads which are substantially constant regardless of the speed at which they are driven.

It is therefore a primary object of our invention to provide a servo system including a servo motor so constructed and arranged as to provide a torque which is substantially independent of operating speeds or which may have a substantially constant torque output at all operating speeds thereof.

It is a further object of our invention to provide a system of the foregoing character which comprises stabilizing means for supplying a D.C. potential to the signal amplifier which is proportional to a time derivative of a displacement operation of the servo motor.

A still further object resides in the provision of a servo system having the above-mentioned torque output characteristics and in which an A.C. potential proportional in amplitude to a time derivative of a displacement operation of the servo is combined with the control signal initially supplied to the system for providing a stabilized operation thereof.

With the foregoing and other objects in view, our invention includes the novel arrangement and correlation of elements described below and illustrated in the accompanying drawings, in which FIG. 1 is a diagrammatic representation of a preferred form of servo system.

FIG. 2 is a wiring diagram of the elements embodied in the system of FIG. 1.

Figure 3:
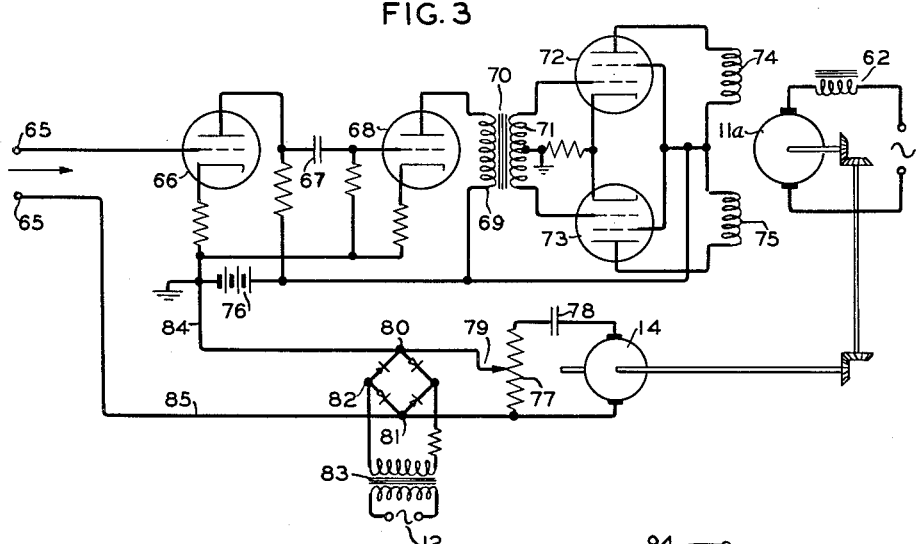
FIG. 3 is a wiring diagram of the amplifier portion of a modified form of servo system.

In the foregoing, we have indicated that our present invention is particularly adapted for use in a director, and it will of course be understood that it may well be used to supply a torque in operating any load which is substantially independent of speed. Ordinarily, the torque of electric servos drops off with increase in speed, and our invention may be used to provide a more constant torque. The torque is roughly proportional to a control signal which, in the present illustration of our invention, is the algebraic sum of an error signal plus a stabilizing signal.

In order to maintain a substantially constant torque output throughout a given speed range, the armature currents of the electric servo motor should be maintained substantially constant. That is, the armature current value should be independent of the back E.M.F. of the motor.

A method for limiting the drop in current with speed resides in applying a voltage to the armature which is greater than the back E.M.F. of the motor, and inserting a sufficiently large resistance in series with the armature to limit the current to its rated value. A second method for limiting the reduction in current applicable to the A.C. motors, resides in the use of a reactance or impedance for limiting the current.

Referring first to FIG. 1, wherein we have diagrammatically illustrated a preferred form of servo system embodying a commutator type A.C. motor, we have shown coarse and fine Selsyn transmitters indicated generally at 1 and 2 as the means for supplying an electrical error control signal to the servo amplifier.

The coarse transmitter is connected directly with the data shaft 3, in accordance with which the servo motor is to be operated. The fine transmitter 2 is connected to shaft 3 through gear train 4. In practice, the coarse and fine Selsyns may operate at, for example, a 16 or 15 to 1 ratio. The transmitters are respectively connected through conductors 5 and 6 to Selsyn coarse and fine receivers 7 and 8. The error signal outputs of these receivers are supplied in a manner more clearly illustrated in FIG. 2, through a synchronizing network 9 to a mixer modulator or amplifier 10.

The output of the amplifier is connected directly to the field windings of servo motor 11. The armature of the motor 11 is, in the preferred form of the present invention, connected in circuit with a current limiting device, hereinafter described, and across a source of alternating current 12. Motor 11 operates a load shaft 13 and also drives, as schematically illustrated, a permanent magnet generator 14, by means of shaft 15, which shaft also drives through bevel gears 16, shaft 17, and bevel gears 18, the rotor of coarse Selsyn receiver 7. The fine Selsyn receiver is driven at the same ratio with respect to the coarse receiver as are the fine and coarse transmitters through the gear train 19. The signal obtained from the Selsyn system is proportional to the error in the servo follow-up.

A preferred system of our invention, which is illustrated in FIG. 2, corresponds to the schematic showing in FIG. 1 and illustrates the coarse and fine Selsyn transmitters 1 and 2 as comprising the rotors 20 and 21, respectively, which are driven from the data shaft 3 and gear train 4 as above described and are connected across a source of alternating current 12. The stators 22 and 23 thereof are connected through conductors 5 and 6, respectively, to stators 24 and 25 of the Selsyn receivers. The rotors 26 and 27 of the receivers are driven through the shafts and gearing above described, and are electrically connected through a synchronizing network with the primary 28 of the transformer 29.

In the synchronizing network herein illustrated, the rotor 27 of the fine Selsyn receiver 25 is electrically connected through resistor 30 across two groups of series-connected selenium cells 31 and 32 which groups are connected in parallel and so arranged that current may flow in opposite directions through the respective series connected cells. Rotor 27 is also connected through resistor 33 and conductor 34 and 35 across the primary 28 of the transformer 29. The rotor 26 of the coarse Selsyn is connected at one end with the conductor 34 and at the other end through the secondary of a transformer 36 with two parallel connected groups, each comprising series connected selenium cells, 37 and 38 which, in turn, are connected to ground through conductor 39. Conductor 39 is also connected between ground and one side of the parallel-connected groups of selenium cells 31 and 32.

The foregoing described synchronizing network functions to supply a signal from the fine Selsyn receiver to the amplifier when a comparatively small error angle exists and to supply a controlling signal from the coarse receiver when the error angle exceeds a predetermined value. When the error angle is less than said predetermined value, the resistance of the selenium cells 31 and 32, connected across the rotor winding 27 of the fine Selsyn, is comparatively high and the signal voltage from the receiver is impressed across the primary 28 of the transformer 29. At the same time, the voltage output of the rotor 26 of the coarse Selsyn is insufficient to overcome the resistance offered by the selenium cells 37 and 38 and the impedance of the secondary of transformer 36, and hence no signal voltage will be supplied from the rotor 26.

However, when the error angle exceeds the above pointed out predetermined value, the voltage output from the rotor 27 of the fine Selsyn will be of a value sufficient to break down the resistance of the cells 31 and 32 and, therefore, no greater signal will be supplied from the fine Selsyn receiver to transformer 29. Under the latter assumed conditions, however, the voltage output from rotor 26 of the coarse Selsyn will be sufficient to pass current through the impedance and resistance of the cells 37 and 38 and, as a result, the signal voltage output from the coarse Selsyn receiver will be impressed across the primary 28 of the transformer 29. The transformer 36 is employed to prevent ambiguity in synchronizing the coarse and fine Selsyns, if, for example, a 16 to 1 ratio therebetween is employed. With a 15 to 1 ratio, no ambiguity can be present, since the ratio is odd.

The secondary windings 40, 41 of transformer 29 are connected in a mixer modulator or amplifier stage comprising twin triode tubes 42 and 43 which function to provide an alternating current output proportional to the combined error input signal and stabilizing signal derived from the permanent magnet generator 14, as hereinafter described. One end of secondary winding 40 is connected to grid 44 of tube 42, and the corresponding end of secondary 41 is connected to grid 45 of tube 43. The other end of secondary 41 is connected to the second grid 46 of tube 42 and the corresponding end of secondary 40 is connected to the second grid 47 of tube 43. As illustrated, secondaries 40 and 41 are center-tapped and connected through resistors 48 to ground and through resistor 49 to the cathodes of the two tubes.

The amplifier is rendered phase sensitive by supplying alternating potentials to the plates thereof from transformer 50. The primary of transformer 50 is connected across a source of alternating potential 12, and one end of the secondary thereof is connected to the mid-point of one primary 51 of coupling transformer 52 and the other end is connected to the mid-point of a second primary 53. A mid-tap on the secondary of transformer 50 is connected to ground as shown. The plates of tube 42 are connected to opposite ends of the primary 53 and the plates of tube 43 are connected to opposite ends of the primary 51.

The permanent magnet generator 14 is connected across a resistor 54, one end of which is connected to the center tap of the secondary 40 of transformer 29 and the other end of which is connected through condenser 55 to the center tap of the other secondary 41 of transformer 29. In the embodiment shown, the output circuit of generator 14 comprises what may be generally termed a rate-taking or differentiating circuit including resistor 48 and condenser 55. The generator provides a stabilizing signal proportional to speed. The condenser serves only to block the zero frequency component which would produce an error proportional to speed in the steady state. This stabilizing signal is of a D.C. character, whereas the signal supplied from the Selsyn receivers is of an alternating character. These two signals are combined through the action of tubes 42 and 43 to provide an alternating current output dependent in magnitude and phase upon the algebraic sum of the error signal voltage supplied from the Selsyns and the stabilizing voltage supplied from the permanent magnet generator 14. The generator 14, of course, serves to prevent or minimize over-shooting of the servo and to prevent undue oscillations about a zero error signal position.

The transformer 52 serves to couple the output of the mixer modulator stage with an amplifier stage, the secondary winding 56 thereof being connected between the grids of tubes 57 and 58 which are connected in push-pull fashion. The plates of these tubes are connected directly with the field windings 59 and 60 of servo motor 11, the windings being connected together as shown and connected to a source 61 of plate potential.

From the foregoing it will be understood that when an error signal voltage is supplied from the Selsyn receivers or signal generators, alternating current will be supplied to the field windings 59 and 60 of the servo motor 11. The phase sense of the field current, with respect to the phase of the alternating current supplied to the armature of the servo, will control the direction of operation thereof, and the amplitude of the field current, dependent upon the amplitude of the error signal, will govern the torque developed.

Figure 6:
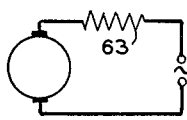
Figure 7:
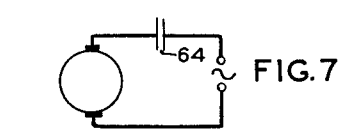

The armature of the motor 11 is connected across a source of alternating current 12 and current limiting means are connected in circuit therewith. In accordance with the preferred embodiment of our invention, the current limiting means comprises the choke 62 which includes a reactance component. As shown in FIG. 6, a resistance 63 may be connected in series to the armature of the motor and will function to diminish the drop in torque output of the motor with increase in speed. As shown in FIG. 7, a condenser 64 may be employed and the function thereof will be apparent from the following discussion of the choke 62.

The relationship of the torque with respect to the armature and field currents and the phase angle therebetween is shown mathematically in the following.

$$V = E + IZ$$

where: V is the applied voltage; E—back E.M.F.; I—the armature current; and Z—the impedance.

Also, $$E = k_1 \cdot n \cdot \phi_m$$

where: $k_1$ is a constant; $n$—speed; and $\phi_m$ is the maximum value of field flux and in phase with E.

$$\text{Power output} = |E| \cdot |I| \cos \widehat{EI} = k_2 \cdot T \cdot n$$

where: $|E|$ and $|I|$ are absolute values; $\cos \widehat{EI}$ is the cosine of the angle between E and I; $k_2$ is a constant; and T is the torque.

Then, $$T = \frac{|E| \cdot |I| \cos \widehat{EI}}{k_2 n} = \frac{k_1}{k_2} \phi_m |I| \cdot \cos \widehat{EI}$$

Let Z have an angle $\theta$ and E an angle $\beta$ with respect to V—the applied voltage.

$$I = \frac{V - E}{Z} = \frac{V - k_1 n \phi_m}{Z}$$

$$I = \frac{V - k_1 n \phi_m \cos \beta - j k_1 n \phi_m \sin \beta}{Z \cos \theta + j \sin \theta}$$

$$I = \sqrt{\frac{(V - k_1 n \phi_m \cos \beta)^2 + (k_1 n \phi_m \sin \beta)^2}{|Z|}}$$

$$\left| \tan^{-1} \frac{-k_1 n \phi_m \sin \beta}{V - k_1 n \phi_m \cos \beta} - \theta \right.$$

$$\widehat{EI} = \beta + \theta - \tan \frac{-1 - k_1 n \phi_m \sin \beta}{V - k_1 n \phi_m \cos \beta}$$

Assuming that $\beta = -\theta$, then $$\cos \widehat{EI} = \frac{V - k_1 n \phi_m \cos \beta}{\sqrt{(V - k_1 n \phi_m \cos \beta)^2 + (k_1 n \phi_m \sin \beta)^2}}$$

Therefore, (1)
$$T = \frac{k_1}{k_2} \cdot \frac{\phi_m}{|Z|} (V - k_1 n \phi_m \cos \beta)$$

From Equation (1) it is evident that the torque varies linearly with speed and that the reduction of torque with speed can be reduced by increasing the value of $\beta$ with respect to $\theta$.

In general, if $\beta$ is not equal to $-\theta$, it can be shown mathematically that (2)
$$T = \frac{k_1}{k_2} \cdot \frac{\phi_m}{|Z|} [V \cos(\theta + \beta) - k_1 n \phi_m \cos \theta]$$

Thus from Equation (2), it will be seen that the initial torque is reduced but the torque-speed slope remains the same function of $\theta$.

Hence, in order to get minimum reduction of torque with speed, $\theta$ should be equal to or approach 90°. Therefore, inductance or capacitance, or a choke or condenser, should be employed for limiting the armature current.

Figure 5:
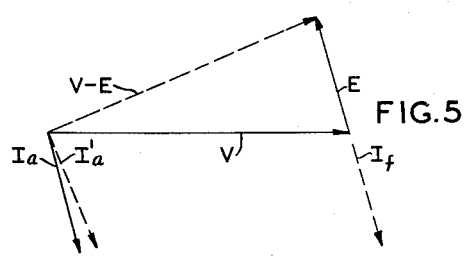
FIG. 5 is a vector diagram showing the relationship of voltages and currents in the servo motor, and FIGS. 6 and 7 diagrammatically represent modified means for controlling the output torque of the servo motor.

The relationship of the values above discussed is vectorially illustrated in FIG. 5, wherein we have assumed $I_a$ the armature current (full line vector) and $I_f$ the field current are in phase. V represents the impressed voltage and E the back E.M.F. It will be observed that as the back E.M.F. rises the value of the vector V–E will increase and that the vector $I_a$ will assume, for example, the dashed line position $I_a'$ and will increase in value.

Therefore, since $$T \propto |I_a| \cdot |I_f| \cos \theta$$

where $\theta$ is the angle between $I_a$ and $I_f$, an increase in the phase angle between $I_a$ and $I_f$, which would otherwise produce a drop in torque, will be compensated for because the value of $I_a$ will proportionately increase. Therefore, the torque output of the servo motor will remain substantially constant for all operating speeds thereof.

Figure 4:
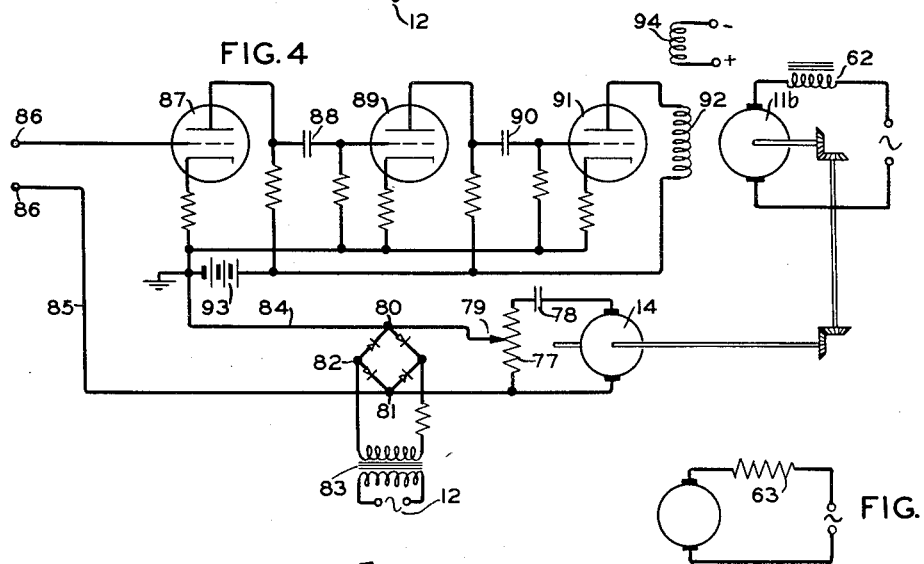
FIG. 4 is a view similar to FIG. 3 of a still further modification.

In FIGS. 3 and 4, we have illustrated modified forms of amplifier circuit for our constant torque output servo motor to which an A.C. signal rather than a D.C. signal is supplied for stabilizing purposes.

In the form of our invention shown in FIG. 3, it will be understood that the error signal is impressed across the terminals 65 and supplied to the grid of a first electron tube 66. The plate of tube 66 is coupled through condenser 67 to the grid of tube 68, and the plate of tube 68 is connected to the primary 69 of a coupling transformer 70. Secondary 71 of transformer 70 is connected between the grids of two tubes 72 and 73, which are arranged in push-pull fashion and have their plates connected in circuit with the field windings 74 and 75 of the torque motor 11a. These windings are connected together as shown and connected with a source 76 of plate potential. In this embodiment of our amplifier circuit, the permanent magnet generator 14 is connected with a rate-taking or differentiating network comprising the resistor 77 and condenser 78. A movable contact 79 may be used to control the magnitude of the D.C. potential derived from resistor 77. The output from this circuit is connected to terminals 80 and 81 of one diagonal of a selenium rectifier bridge or ring modulator 82. The other diagonal of the bridge is connected across the secondary of a transformer 83, the primary of which is connected across a source of suitable alternating current 12. The terminals 80 and 81 are also connected through conductors 84 and 85, respectively, to ground and one of the terminals 65.

The rectifying network or ring modulator functions to supply an A.C. voltage between the conductors 84 and 85 which, in amplitude, is proportional to the D.C. voltage derived from the resistor 77. Hence, an A.C. potential which in magnitude is proportional to the accelerations of the servo motor or an A.C. stabilizing potential is combined with the error signal and supplied to the grid of the first tube 66 of the amplifier circuit. The output of said circuit which is supplied directly to the field windings of the servo motor, will depend in phase upon the combination of error and stabilizing signals.

In the circuit of FIG. 4, the error signal is impressed across the terminals 86 and an A.C. stabilizing signal is supplied from the permanent magnet generator 14, differentiating circuit including resistor 77 and condenser 78 and rectifier bridge or ring modulator 82, which elements are in all respects generally similar to the corresponding portion of the circuit of FIG. 3. In this circuit, however, series-connected amplifying tubes are employed as compared to the series and push-pull connection shown in FIG. 3. The first tube 87 is coupled through condenser 88 to the grid of tube 89 and the plate thereof is coupled through condenser 90 to the grid of tube 91. The plate of tube 91 is connected through the field winding 92 of the torque motor 11b with a source of plate potential 93.

In the form of amplifier circuit shown in FIG. 3, the D.C. components in the output of the push-pull amplifier will cancel out. However, in the circuit of FIG. 4, a D.C. component will be present. If desired, therefore, a winding 94 may be provided which is excited by direct current of such polarity as to cancel out any D.C. component in the field winding 92 or at least to cancel out the quiescent values of such current.

While we have described our invention in its preferred embodiments, it is to be understood that the words which we have used are words of description rather than of limitation, and that changes within the purview of the appended claims may be made without departing from the true scope and spirit of our invention in its broader aspects.

What is claimed is:

1. In a servo system characterized by its small change in torque output with variations in operating speeds, an alternating current signal generator, an electrical servo motor having armature and field windings, a source of alternating potential having a substantially constant value of maximum amplitude connected with said armature, impedance means in circuit with said armature for controlling the flow of current thereto, and amplifier means comprising phase-sensitive signal amplifying means controlled by the output of said signal generator and having its output connected to supply current to the field of said motor.

2. In a servo system characterized by its small change in torque output with variations in operating speeds, an alternating current signal generator, an electrical servo motor having armature and field windings, a source of alternating potential having a substantially constant value of maximum amplitude connected with said armature, impedance means having a reactance component in circuit with said armature for controlling the current flow therein, and amplifier means comprising phase-sensitive signal amplifying means controlled by the output of said signal generator and having its output connected to supply current to the field of said motor.

3. In a servo system characterized by its small change in torque output with variations in operating speeds, an alternating current signal generator, an electrical servo motor having armature and field windings, a source of alternating potential having a substantially constant value of maximum amplitude connected with said armature, a choke coil connected in series with said armature for controlling the current flow therein, and amplifier means comprising phase-sensitive signal amplifying means controlled by the output of said signal generator and having its output connected to supply current to the field of said motor.

4. In a servo system characterized by its small change in torque output with variations in operating speeds, a source of signal voltage, an electrical servo having armature and field windings, a source of alternating current having a substantially constant value of maximum amplitude connected with said armature, impedance means in circuit with said armature for controlling the flow of current thereto, amplifier means comprising a phase-sensitive signal amplifier responsive to said signal voltage and having its output connected to the field windings of said motor, means for generating a signal voltage proportional to a time derivative of a displacement operation of said servo, and means for supplying said two signal voltages to said amplifier, said amplifier comprising means for providing an alternating current output to said field windings.

5. In a servo system characterized by its small change in torque output with variations in operating speeds, a source of signal voltage, an electrical servo motor having armature and field windings, a source of alternating current having a substantially constant value of maximum amplitude connected with said armature, impedance means in circuit with said armature for controlling the flow of current thereto, amplifier means comprising a phase-sensitive signal amplifier responsive to said signal voltage and having its output connected to the field windings of said motor, means for generating a stabilizing signal voltage dependent upon accelerations in displacement operations of said servo, and means for supplying said two signal voltages to said amplifier, said amplifier comprising means for providing an alternating current output to said field windings dependent in amplitude and phase upon the algebraic summation of said signal voltages.

6. In a servo system characterized by its small change in torque output with variations in operating speeds, a source of signal voltage, an electrical servo motor having armature and field windings, a source of alternating current having a substantially constant value of maximum amplitude connected with said armature, impedance means in circuit with said armature for controlling the flow of current thereto, amplifier means comprising a phase-sensitive signal amplifier responsive to said signal voltage and having its output connected to the field windings of said motor, means for generating a direct current signal voltage proportional to a time derivative of a displacement operation of said servo, and means for supplying said two signal voltages to said amplifier, said amplifier comprising modulator-mixer means for supplying an alternating current output to said field windings dependent in amplitude and phase upon the algebraic summation of said signal voltages.

7. In a servo system characterized by its small change in torque output with variations in operating speeds, a source of signal voltage, an electrical servo motor having armature and field windings, a source of alternating current having a substantially constant value of maximum amplitude connected with said armature, impedance means in circuit with said armature for controlling the flow of current thereto, signal amplifying means responsive to said signal voltage and having its output connected to the field windings of said motor, means for generating an alternating signal voltage proportional in amplitude to a time derivative of a displacement operation of said servo, and means for supplying said two signal voltages to said amplifier, said amplifier comprising means for supplying an alternating current output to the field of said servo.

8. A servo system of the character recited in claim 4 in which the armature current-limiting means comprises an impedance having a reactance component.

9. A servo system of the character recited in claim 6 in which the armature current-limiting means comprises an impedance having a reactance component.

10. A servo system of the character recited in claim 7 in which the armature current-limiting means comprises an impedance having a reactance component.

11. In a servo system characterized by its substantially constant torque output for all operating speeds thereof, a signal generator adapted to supply an alternating signal voltage, an electrical servo motor having armature and field windings, a source of alternating current having a substantially constant value of maximum amplitude connected with said armature, impedance means having a reactance component for controlling the current flow through said armature, signal amplifying means responsive to the output of said signal generator and having its output connected to the field of said motor, means for generating an alternating signal voltage proportional to a time derivative of a displacement operation of said servo, means for supplying said two signal voltages to said amplifier, said amplifier including means for supplying an alternating current output to the field of said servo, and means for inducing in said motor field a direct current of opposite polarity to the direct current component of the output of said amplifier.

12. In a servo system characterized by its small change in torque output with variations in operating speeds, a source of signal voltage, an electrical servo motor having armature and field windings, a source of alternating potential having a substantially constant value of maximum amplitude connected with said armature, impedance means in circuit with said armature for controlling the flow of current thereto, and amplifier means controlled by said signal voltage for supplying alternating current to the field of said motor.

13. A servo system of the character recited in claim 12 in which the armature current-controlling means comprises an impedance having a reactance component.

14. A servo system of the character recited in claim 12 in which the armature current-controlling means comprises a choke coil.

15. A servo system of the character recited in claim 12 in which the armature current-controlling means includes capacitance.

16. In a servo system characterized by its small change in torque output with variations in operating speeds, a source of signal voltage, an electrical servo motor having armature and field windings, a source of alternating potential having a substantially constant value of maximum amplitude connected with said armature, means for causing an increase in the armature current with an increase in speed of the motor whereby to compensate for phase angle increase between armature and field currents, and amplifier means controlled by said signal voltage for supplying alternating current to the field of said motor.

References Cited in the file of this patent

UNITED STATES PATENTS

| Re. 16,667 | Hewlett et al. | July 5, 1927 |
| 609,991 | Lamme | Aug. 30, 1898 |
| 1,554,698 | Alexanderson | Sept. 22, 1925 |
| 2,040,014 | Moseley | May 5, 1936 |
| 2,113,436 | Williams | Apr. 5, 1938 |

FOREIGN PATENTS

| 777,920 | France | Mar. 5, 1935 |
| 489,271 | Great Britain | July 22, 1938 |